United States Patent [19]

Mouille et al.

[11] 4,281,967
[45] Aug. 4, 1981

[54] RESONATOR DEVICE FOR DAMPING THE VIBRATIONS OF A ROTOR OF A ROTARY-WING AIRCRAFT

[75] Inventors: Rene L. Mouille, Aix-en-Provence; Gérard C. L. Genoux, Gardanne; Marc A. Declercq, Pelissanne; Jean-Luc M. Leman, Aix-en-Provence; Robert J. Suzzi, Marseilles, all of France

[73] Assignee: Societe Nationale Industrielle Aerospatiale, France

[21] Appl. No.: 9,578

[22] Filed: Feb. 5, 1979

[30] Foreign Application Priority Data

Feb. 10, 1978 [FR] France .................................. 78 03810

[51] Int. Cl.³ .............................................. B64C 27/32
[52] U.S. Cl. ...................................... 416/145; 416/500; 74/574
[58] Field of Search .................. 416/145, 500; 74/574

[56] References Cited

U.S. PATENT DOCUMENTS

| 2,576,105 | 11/1951 | Childs | 416/145 X |
| 3,219,120 | 11/1965 | Hooper | 416/145 |
| 3,298,443 | 1/1967 | Burkam et al. | 416/145 X |
| 3,387,505 | 6/1968 | Rumsey | 74/574 |
| 3,509,971 | 5/1970 | Gerstine et al. | 416/500 X |
| 3,910,720 | 10/1975 | Vincent | 416/145 |
| 4,044,628 | 8/1977 | Jacks | 74/574 |
| 4,145,936 | 3/1979 | Vincent et al. | 74/574 |
| 4,160,390 | 7/1979 | Spaetgens | 74/574 |

FOREIGN PATENT DOCUMENTS

| 1010611 | 6/1952 | France | 74/574 |
| 1051106 | 1/1954 | France | 74/574 |
| 1271872 | 8/1961 | France | 74/574 |
| 1287949 | 2/1962 | France | 74/574 |

Primary Examiner—Everette A. Powell, Jr.
Attorney, Agent, or Firm—Karl W. Flocks

[57] ABSTRACT

The invention relates to a device for damping the vibrations of a rotary-wing aircraft rotor. An annular weight is disposed concentrically of the rotor axis. This weight is supported by at least three resiliently deformable elements such as helical springs, radially biased in directions distributed regularly around the rotor axis. The inner ends of the springs directly bear on a part extending the rotor shaft axially. Their outer ends directly bear on the annular weight so that the spring apply statically balanced centrifugal thrusts to the annular weight. The springs are so still that they support the annular weight without substantially bending.

19 Claims, 9 Drawing Figures

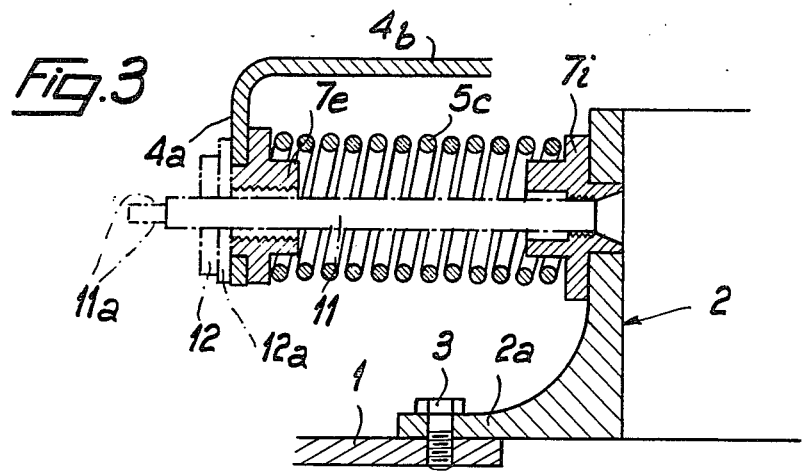
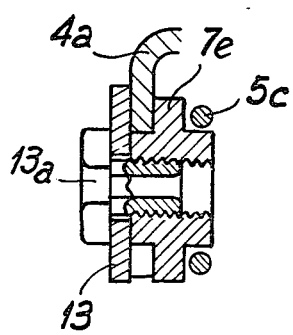
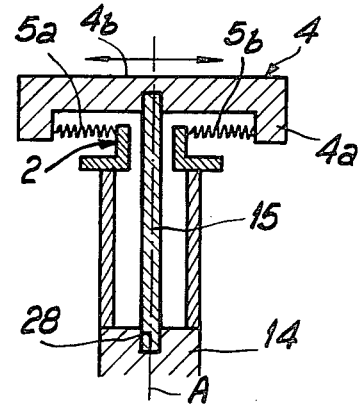
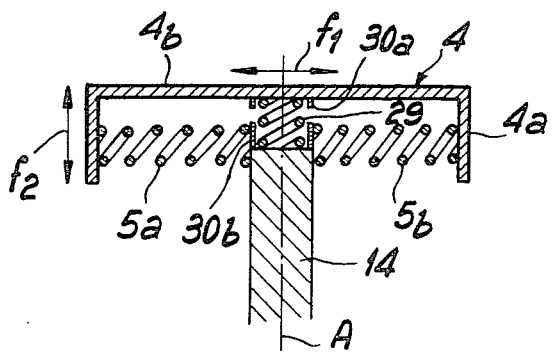
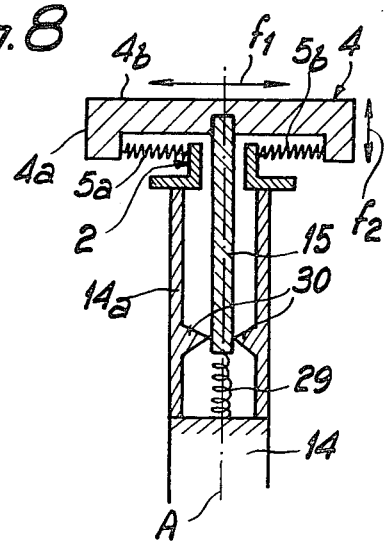

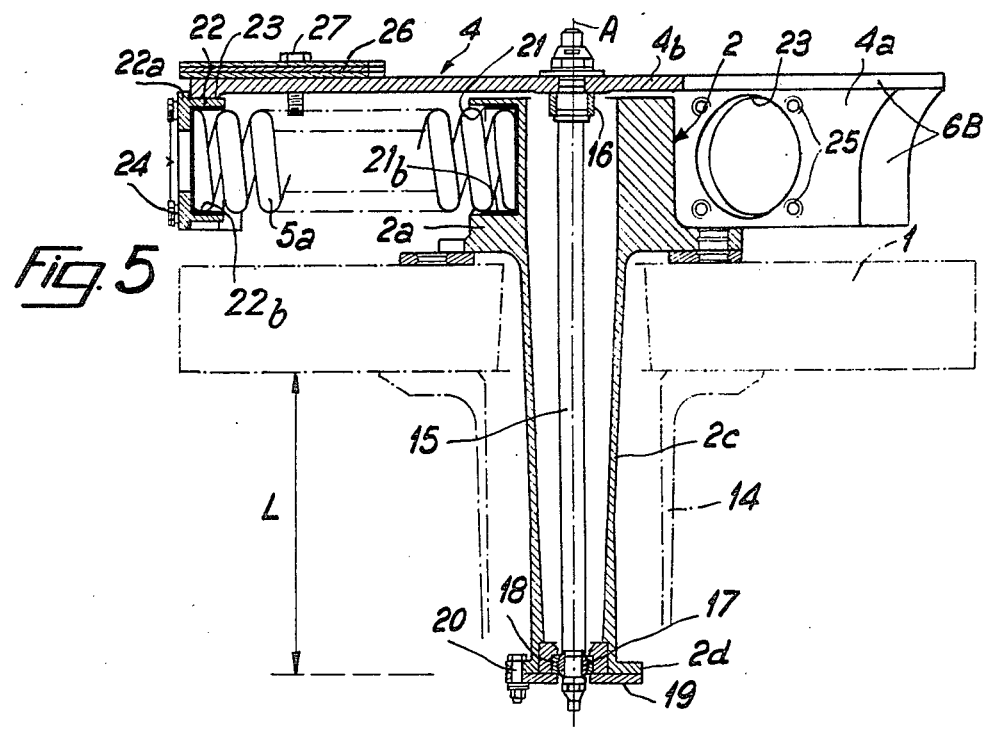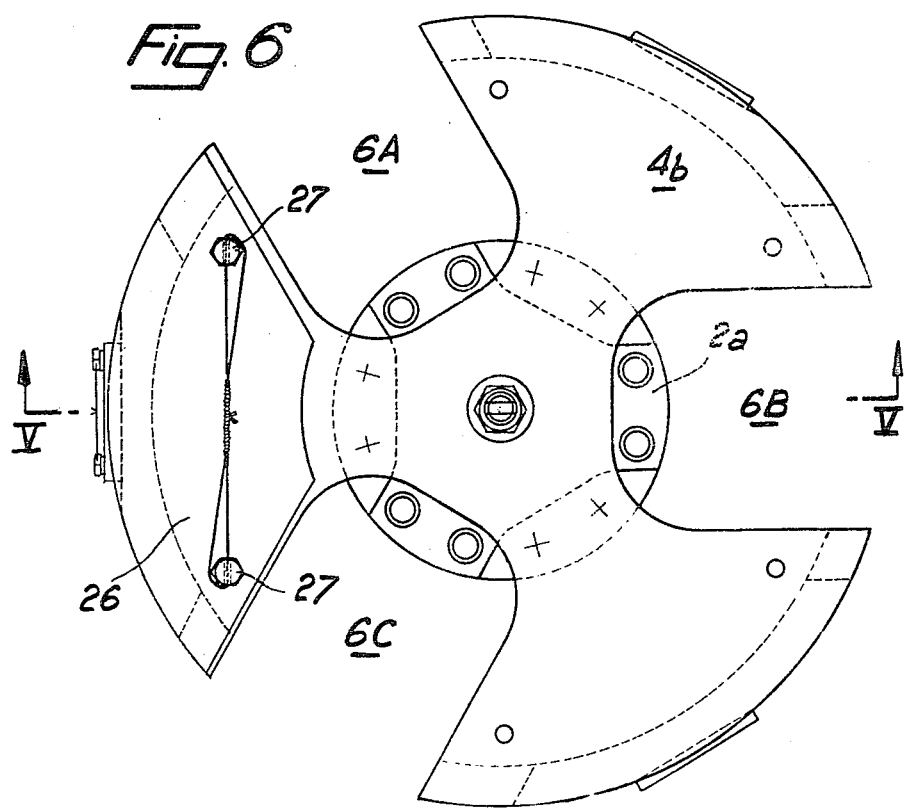

RESONATOR DEVICE FOR DAMPING THE VIBRATIONS OF A ROTOR OF A ROTARY-WING AIRCRAFT

This invention relates to a resonator device for damping the vibrations of a rotor of a rotary-wing aircraft.

Of course, the vibration which arise in rotary-wing aircraft, more particularly helicopters, are of such an extent as to be likely to limit the maximum speed of the aircraft, reduce its structural strength and disturb passenger comfort inasmuch as the vibrations produce alternating stresses and oscillations throughout the aircraft and more particularly in the aircraft cabin.

French Pat. No. 871,944, filed by F. SALOMON on May 18, 1940, describes a device for reducing more particularly the vibrations of the rotors of rotating machinery by means of auxiliary weights which can oscillate by the returning action of resilient forces produced by resilient substances submitted to stresses which vary in accordance with the speed of rotation. The resilient substances can form part of the oscillating weights. The various constructions described in the corresponding French Patent Specification use auxiliary weights adapted to oscillate mainly in directions tangential about the axis of rotation; also, these constructions are so complex mechanically that, specially because of their fragility, they are unsuitable for use with rotors of rotary-wing aircraft.

A considerable number of devices have already been proposed for damping the vibrations produced by the or each rotor of a rotary-wing aircraft. Many of the known devices use resonators.

In a first group of known devices using resonators the same are disposed at various places in the fuselage of the rotary-wing aircraft, more particularly a helicopter, and possibly on its flight control elements. The resonators are e.g. strip or spring resonators each oscillating at its natural frequency with an amplitude and in a phase such as to absorb at least partly the alternate forces transmitted to said resonator from its fixture. Resonator devices of this kind have a number of disadvantages. Since a resonator must be mounted at with every place where it is required to damp vibrations, the weight of the aircraft is increased thereby considerably. The vibration-damping effect provided by each resonator is limited to the region near the place where it is secured, while the presence of the resonator may have the effect of increasing vibrations elsewhere in the aircraft. Finally, since the natural frequency of each resonator is usually fixed, the resonator is effective only in predetermined vibratory conditions of the aircraft, more particularly at a predetermined rotor speed.

In endeavours to obviate the latter disadvantage resonators having a variable natural frequency, specially a natural frequency which can be adapted automatically to the various vibratory conditions of the aircraft, have been devised. Automatic control of the resonator natural frequency calls of course for considerable mechanical and electronic facilities which make such devices expensive and relatively unreliable, so that they are unsuitable for lightweight low-cost helicopters.

In a second group of known resonator devices the resonator is placed immediately above the rotor hub and is energized directly thereby, and the natural frequency of the resonator is automatically adapted to the frequency of the rotor-produced vibrations, the latter frequency being proportional to rotor speed. In one known device of this kind the automatic adaptation is achieved by the provision in the resonator of bobweights which are articulated to the rotor hub and which experience centrifugal force and the opposing force of springs U.K. Pat. No. 1,465,266, filed by *WESTLAND AIRCRAFT LIMITED* on Apr. 26, 1973, describes a vibration-damping device for aircraft rotors, the device comprising a circular weight so mounted resiliently around the axis of rotor rotation as to corotate with the rotor. The circular weight is preferably of inverted channel cross-section and is borne by a structure of link parallelograms The resilience is provided in the main by helical springs which bear at their inner ends on the inner ends of radial cylinders, the outer ends of the cylinders being connected to the circular weight, the helical springs bearing at their outer ends on pistons adapted to slide in the respective cylinders and having rods which extend freely through the respective cylinder inner ends and which are connected to a spindle prolonging the rotor shaft axially, so that the helical springs apply radial pulling forces to the circular weight. This known device is highly complex mechanically, expensive and unreliable. Its vibrations are accompanied by considerable friction at the links of its parallelograms and in the elements on which the ends of the helical springs bear. Consequently, the "sharpness" of the resonance of the oscillating circular weight is reduced considerably, with the result of a considerable reduction in the effectiveness of this known resonator device.

French Patent Application No. EN 77 01396, filed by *WESTLAND AIRCRAFT LIMITED* on Jan. 19, 1977, desscribes another vibration-damping device also comprising a circular weight so mounted resiliently around the axis of rotor rotation as to co-rotate with the rotor; in this construction the circular weight is connected to a central element rigidly secured to the rotor shaft by a number of flexible spiral arms which bear the circular weight as well as rotating the same. This device too has the two disadvantages of being a difficult construction mechanically and of being expensive.

The resonator device according to this invention for damping the vibrations of a rotor of a rotary-wing aircraft also comprises a substantially annular weight disposed concentrically of the rotor axis; however, the device according to the invention is designed to be of very simple construction, with the advantage over the prior art of a considerable cost reduction and a considerable increase in reliability and working life. It can also be mounted very readily and requires virtually no maintenance.

In the resonator device according to this invention for damping the vibrations of a rotor of a rotary wing aircraft, the annular weight is supported mainly by at least three resiliently deformable elements which are biased (prestressed) radially in directions distributed regularly around the rotor axis and which bear directly at their inner ends on the rotor shaft or on a spindle disposed in axial extension thereof and at their outer ends on the annular weight so as to apply statically balanced centrifugal thrusts to the weight, the stiffness of the biased elements being such that they support the annular weight without appreciable bending.

The annular weight of the resonator device according to this invention is therefore supported directly by the resiliently deformable elements which make the device resilient. The resiliently deformable element which, in a preferred embodiment of the invention, are helical springs whose axes radiate in directions distributed regularly around the rotor axis, each bear directly at one end on the rotor shaft or on a spindle rigidly secured thereto and at the other end directly on the annular weight, so that they are very simple to mount. Unlike prior art previously referred to, the device according to the invention is devoid of link parallelogram type support elements and of flexible spiral arms whose disadvantages have been mentioned. The device according to this invention is therefore devoid of articulations and other moving connections likely to cause considerable friction as the annular weight oscillates. Consequently, the oscillating annular weight of the resonator device according to this invention can have a very sharp resonance, an advantageous feature for effective damping of the vibrations produced by a rotor of a rotary-wing aircraft.

Preferably, the annular weight disposed on the spindle which extends the rotor shaft axially in shape resembles a bell having an annular skirt and a preferably plane top member, the latter extending transversely of the spindle; the skirt and, if required, the top member are formed in registration with each rotor blade with an aperture, to facilitate the beating movements of the corresponding blade.

In a variant of the resonator device according to the invention, the spindle, which is tubular and open at both its ends, has extending through it a rod having one end rigidly secured to the centre of the weight top member and having its other end extending into and internally coupled with the hollow rotor shaft. According to this invention, this coupling reduces the virtually negligible values the friction opposing vibrations of the annular weight. For instance, the rod is rigid and its said other end is coupled with the hollow rotor shaft by way of a swivel joint secured to the inner wall of such shaft or of a tubular extension of the spindle, such extension extending into the rotor shaft. According to another feature of the invention, the rod is flexible and its said other end is engaged on the rotor shaft substantially axially thereof.

According to another advantageous feature of the invention, the ends of the helical springs are engaged at least on the spindle, so that the already very slight bending of the springs by the annular weight is reduced still further.

Embodiments of a resonator device according to this invention for damping the vibrations of the main rotor of a helicopter will be described hereinafter and are shown diagrammatically in the accompanying drawings, in both cases by way of example.

In the drawings:

FIG. 3 is a partial section on the line III—III of FIG. 2;

FIG. 4 shows a detail of the first embodiment;

FIGS. 5 and 6 are a view in section on an axial plane and a plan view, respectively, of a second embodiment, and FIGS. 7, 8 and 9 are each diagrammatic views in section in an axial plane of three other embodiments.

Figure 1:
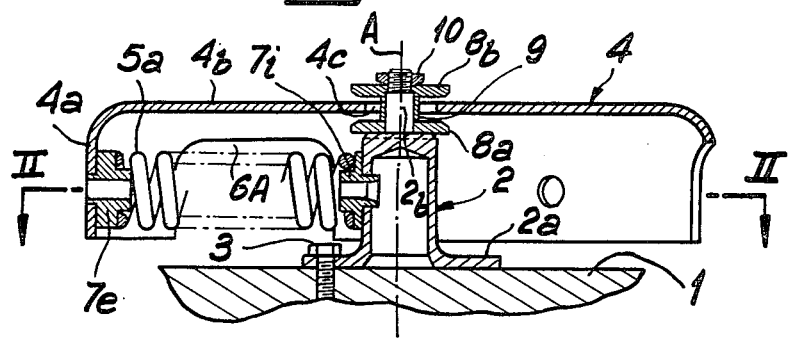
FIG. 1 is a section in an axial plane through a first embodiment

Referring to FIG. 1, the hub of the main rotor of a helicopter has a rigid central part 1 to which a bottom flange 2a of a spindle 2 is secured, e.g. by bolts, as 3, so that the spindle axis coincides with the rotational axis A of the shaft of the rotor (not shown). In this embodiment an annular weight 4 is substantially in the shape of a bell comprising an annular skirt 4a and a substantially flat top member 4b. As will be described hereinafter, the weight 4 is so supported that, with the rotor stationary, the axis of symmetry of the weight 4 coincides with the rotor shaft axis A, the top member 4b of the weight extending transversely of the spindle 2.

According to this invention, the annular weight 4 is mainly supported by three helical springs 5a, 5b, 5c whose axes radiate in directions distributed regularly around the rotor axis A—i.e. the axes are at a 120° spacing from one another. The springs 5a–5c bear at their inner ends on the spindle 2, which is in axial extension of the shaft of the rotor (not shown), and at their outer ends on the weight skirt 4a and are of a size and design such as to be biased (prestressed) radially of their respective axes so as to apply to the skirt 4a centrifugal thrusts which, if the three springs 5a–5c are identical, are balanced statically. Also, the stiffness of the springs 5a–5c is such that the same can support the weight of the member 4 without appreciable bending, specially so that in the static condition shown in FIG. 1 the bottom edge of the shirt 4 a does not contact the central part 1 of the rotor hub.

According to another feature of the invention, the shirt 4a is formed in registration with each blade (not shown) of the rotor with an aperture 6A, 6B, 6C to enable the corresponding blade to make vertical beating movements.

Figure 2:
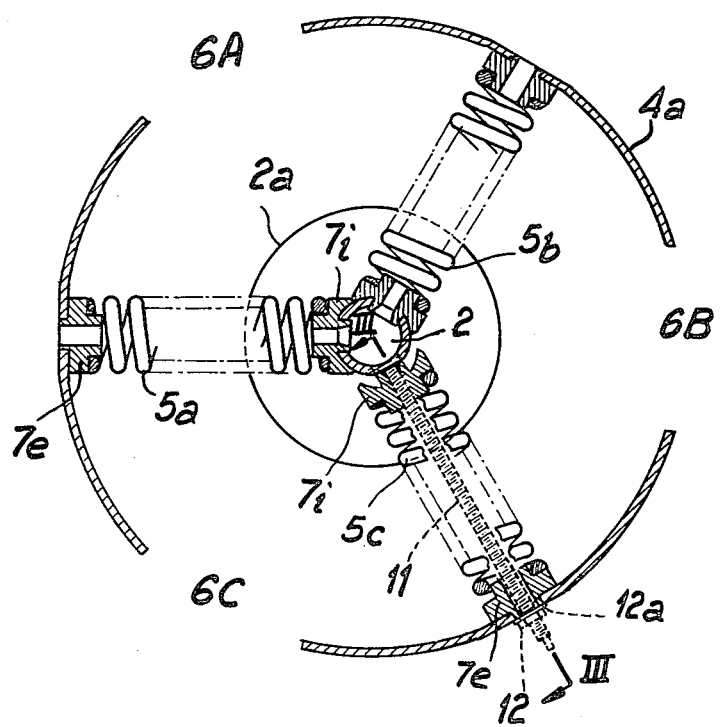
FIG. 2 is a section on the line II—II of FIG. 1.

In the embodiment shown in FIGS. 1 and 2, the inner and outer ends of each spring, as 5a, are engaged on a first flanged cylindrical member 7i and a second flanged cylindrical member 7e respectively engaged in apertures in the wall of the spindle 2 and of the skirt 4a; as the sectional view of FIG. 2 shows, that surface of the flange of the first flanged cylindrical member 7i which is near the axis A is shaped in adaptation to the curvature of the wall of the spindle 2 around the corresponding aperture, whereas the surface of the flange of the second flanged cylindrical member 7e is plane for adaptation to a facet or flat on the inner surface of the skirt 4a around the corresponding aperture. Of course, in the absence of any such facet the flange of the second flanged cylindrical member 7e could be shaped in adaptation to the internal curvature of the skirt 4a. The flanged cylindrical member 7i is pierced with two concentric bores, the first of which is near the outside in relation to the rotor axis, is plain and is of larger diameter than the second and inner bore, the latter being partly tapped and flaring slightly in that part of the flanged cylindrical member 7i which is received in the aperture of the spindle wall. Extending right through the member 7e transversely is a tapped aperture whose diameter is substantially equal to the diameter of the first bore in the member 7i (FIG. 3).

According to another feature of the invention, a portion 2b of reduced cross-section of the spindle 2, such portion extending the same upwardly in FIG. 1, extends through a central aperture 4c in the weight top member 4b and has placed on it therebelow a preferably metal disc or washer or the like 8a whose outer diameter is greater than the diameter of the central aperture 4c in the top member 4b and, below the latter aperture 4c, a socket 9 made, for instance, of a plastics having high mechanical strength, the outer diameter of the socket 9 being appreciably smaller than the diameter of the central aperture 4c and, above the weight top member 4b, a second metal disc or washer or the like 8b whose outer diameter is greater than the diameter of the central aperture 4c; at the top end of the spindle 2 a nut 10 which is screwed on the top screwthreaded end of the reduced-diameter portion 2b secures the stack of elements 8a, 9 and 8b.

The annular weight 4 can be mounted on the spindle 2 as follows:

After the washer 8a and socket 9 have been engaged on the top reduced-section part 2b of spindle 2, the three helical springs 5a to 5c and the corresponding flanged cylindrical members 7i and 7e are fitted to the annular weight 4 through the agency of three screwthreaded rods, as 11 (FIGS. 2 and 3), each having at its outer end two facets or flats, as 11a. The inner ends of the rods 11 are screwed into the tapped parts of the inner bores of the flanged cylindrical members 7i, in which bores the corresponding springs are engaged. At the exit of the outer flanged cylindrical member 7e, the outer end of each rod 11 is coupled with the weight skirt 4a by a nut 12 (FIGS. 2 and 3) screwed on rod 11 to engage with the wall of skirt 4a with the interposition of a washer or disc or the like 12a. While the nut 12 is being rotated, rotation of the rod 11 is prevented by means of a spanne which is engaged with the flats 11a at one end of the rod 11 so as to precompress (bias) the corresponding spring 5c against the second and outer flanged cylindrical member 7e, in such a manner that when the annular weight 4 is placed on top of the spindle 2, each of the internal members 7i moves at a distance from the spindle 2 (as shown in FIG. 2 in the case of the member 7i associated with the spring 5c) but is in an appropriate angular position. So that the internal surface of its flange is adapted to the curved outer wall of the spindle 2, the nut 12 is unscrewed from outside the weight 4, expansion of the spring 5c urging the member 7i into the corresponding aperture in the spindle wall with which the inside surface of the flange engages, as shown in FIG. 2 in the case of the members 7i associated with the springs 5a and 5b. The screwthreaded rods, as 11, are then withdrawn by being unscrewed from the apertures in the inner members 7i, whereafter the second metal washer or disc or the like 8b is positioned and the nut 10 is tightened (FIG. 1).

In a possible variant of the assembly just described, instead of flanged outer cylindrical members 7e being used, a seat or recess with which the inner surface of the skirt 4a is formed for the outer end of the corresponding helical spring is used. Embodiments of this kind are very advantageous in that, as shown in FIG. 4, they make it possible to secure an additional weight 13 to the outside of the skirt 4a by means of a bolt 13a screwed from the outside, e.g. in the tapped aperture of every other flanged cylindrical member 7e, after withdrawal of the corresponding rod 11. If this feature is not required, the hole extending through each member 7e need not necessarily be tapped, a plain hole sufficing for the assembly hereinbefore described.

The second flanged cylindrical members 7e, if of the kind which has flanges with plain surfaces as shown in FIG. 2, can, if required, each have a radial centering pin engaging in a corresponding recess in the inner surface of the skirt 4a to give the corresponding member 7e the required angular setting. As a variant, such setting can be produced by means of the skirt aperture which receives the member 7e if such aperture and the corresponding cross-section of the member 7e have a shape which is other than completely circular, e.g., polygonal or if a facet or flat is provided.

Of course, the resonator device just described can be fitted to a helicopter rotor having any number of blades and can have three or more helical springs, the number of rotor blades not necessarily being the same as the number of helical springs.

To simplify matters, however, consideration will now be given to a resonator device which has three helical springs and which is associated with a three-bladed rotor (b=3).

Because of the considerable longitudinal stiffness of the helical springs, the annular weight, when driven by the rotor at the angular velocity $\Omega_r$, performs vibrations or oscillations whose main components lie in a plane perpendicular to the axis of rotor rotation, so that this resonator device according to this invention can damp only those vibrations which occur in a plane substantially parallel to the plane of rotor rotation. For maximum effective damping, the natural frequency of the oscillating or vibrating mass consisting of the annular weight and the helical springs must be equal to or at least close to the frequency of the vibrations to be damped - i.e., to $3\Omega_r$ in the case of a three-bladed rotor and more generally to $b\Omega_r$ in the case of a b-bladed rotor. The natural frequency $\omega$ of the oscillating or vibrating mass can be calculated by means of the formula $$\omega = \sqrt{\frac{K}{m + \frac{m_r}{2}}} \quad (1)$$

where K denotes the overall stiffness of the oscillating device, m the central weight and $m_r$ the weight of any of the assumedly identical springs. In the case of a three-bladed rotor it can be shown that:

$$K = 1.5 k_r, \quad (2)$$

$k_r$ denoting the stiffness of each spring.

However, the natural frequency of the resonator device according to this invention as given by formula (1) is not proportional to rotor speed $\Omega_r$, so that resonance must be adjusted for a single value of such speed. This in practice is not a disadvantage since the speed of rotation of the main rotors of modern helicopters is controlled to ±1%. However, in some flight conditions, more particularly during self-rotation manoeuvres, the speed of rotation may exceed its rated value $\Omega_r$ by eg. 10%; preferably, therefore, the resonator device according to this invention is adapted for a rotor speed $\Omega'_r = 1.1 \Omega_r$ - i.e., the device is so dimensioned that its natural frequency $\omega$ complies with the formula:

$$\omega = 3\Omega'_r = 3.3\Omega_r \quad (3)$$

The resonator device according to this invention thus adjusted still provides very effective damping of the vibrations or oscillations of a rotor rotating at its rated speed $\Omega_r$, damping being even slightly better in self-rotation conditions.

The size and design of the resonator device according to this invention derive from using formula (1) hereof which neglects the radial stiffness of the springs. Since the weight and the stiffness of a helical spring are related to one another by the linear relationship:

$$k_r = a m_r + b, \quad (4)$$

the coefficients a and b are found from calculation tables in dependence upon the required working life of the spring. Once a and b and the central weight m have been determined, the size and design of each spring can be completed by means of the following formula $$m_r = \frac{6 \cdot m \cdot \Omega'^2_r - b}{a - 3\Omega'^2_r} \tag{5}$$

$$\text{and } k_r = \frac{3\Omega'^2_r(2am - b)}{a - 3\Omega'^2_r} \tag{6}$$

in which $\Omega'_r = 1.1\Omega_r$.

A considerable advantage which the device according to this invention has over some of the prior art resonator devices is that, when fitted to a b-bladed rotor, it damps not only vibration of frequency $b\Omega_r$ but also vibrations of the frequencies $(b-1)\Omega_r$ and $(b+1)\Omega_r$—i.e., vibrations of frequencies $2\Omega_r$, $3\Omega_r$, and $4\Omega_r$ in the case of a three-bladed rotor. Also, the shape of the device according to this invention with its substantially dome-shaped annular weight is much better for streamlining than most of the other prior art resonators.

In operation the amplitude of the vibrations of the weight 4 in a plane extending transversely of the rotor axis A is limited by the edge of the cental aperture 4c in the weight top member 4b abutting the ring 9. Also, any vertical movements of the annular weight 4 are limited by the metal rings 8a and 8b between which the central part of the weight top member 4b is disposed, the outer disc or washer 8b serving more particularly to retain the weight 4 in the event of any of the springs 5a to 5c rupturing.

In FIGS. 5 and 6 elements which are the same as in FIGS. 1 to 4 are denoted by the same references. The embodiment shown in FIGS. 5 and 6 differs from the embodiment shown in FIGS. 1 to 4 only in the following points:

The apertures 6A to 6C in the weight skirt 4a also extend into the skirt top member 4b, as can be seen in the plan view in FIG. 6, so that the resonator device can be positioned substantially in the plane of the hub, with a consequent reduction in the drag it causes. Also, the spindle 2, which is in shape tubular and open at both ends, has at the bottom a tubular extension 2c which extends through a central aperture in the rigid part 1 of the hub of the rotor (shown in chain-dotted lines) and then engages over a relatively considerable length L in the top hollow part of rotor shaft 14 (also shown in chain-dotted line). Extending throughout the length of spindle 2 and its bottom extension 2c along the axis A of shaft 14 is a rigid rod 15 whose top end is rigidly connected by any appropriate means to the centre of the weight top member 4b. A ring 16 made, for instance, of a plastics having high mechanical strength, is secured to the rod 15 immediately below the member 4b near the top aperture of the spindle 2. The bottom end of the rod 15 is coupled with the bottom spindle extension 2c by way of a small swivel joint comprising a small ball 17 engaged on the bottom and reduced-diameter end of the rod 15, the swivel joint also comprising stationary bearing surfaces 18 secured by any appropriate means in the bottom end of the extension 2c, for instance, by way of an annular cover 19 which bolts 20 secure to a flange 2d of spindle 2. The distance L, and therefore the length of the rod 15, are so chosen in dependence upon the internal diameter of spindle 2 and the bottom extension 2c thereof that the swivel joint 17, 18 permits only reduced inclinations of rod 15 relatively to the axis A, such inclinations being maximal when the Teflon ring 16 co-operates with the edge of the top aperture of the spindle 2. The weight top member 4b can therefore tilt only slightly relatively to the hub 1.

Also, in the embodiment shown in FIGS. 5 and 6 the outer and inner ends of each helical spring 5a-5c are engaged in two recesses 21, 22 disposed one opposite another, one being in the weight skirt 4a and the other being in the spindle outer wall. More particularly, the recess associated with the outer end of each spring, as 5a, takes the form of a socket 22 engaged in an aperture 23 in the skirt 4a. In the embodiment under consideration the socket 22 has external parts, as 22a, which project on either side of the skirt aperture 23 and via which the socket 22 can be secured thereto, for instance, by means of screws 24 which extend through apertures in the base of socket 22 and are screwed into tapped holes 25 in skirt 4a. Preferably, each recess 21 in the outer wall of spindle 2, and each socket 22, has a lining 21b, 22b respectively made of a plastics of high mechanical strength.

In this embodiment, the annular weight 4 without the helical springs, as 5a, and without the sockets, as 22, but with the rigid rod 15 carrying its swivel joint 17, is brought to a position above the tubular spindle 2 and the rod 15 is lowered thereinto. The bearing surfaces 18 of the swivel joints and the securing elements 19, 20 are then assembled, whereafter each of the springs, as 5a, is introduced throu the corresponding skirt aperture 23, the socket 22 is engaged on the outer end of each spring, as 5a, the same is compressed by means of the socket 22 until engaging right home in the aperture 23, and can then be secured by means of screws, as 24, screwed in the tapped holes, as 25.

Additional weights, as 26, can be secured by means of bolts, as 27, for instance, to the outside surface of the weight top member 4b between two consecutive apertures, as 6C and 6A (FIG. 6).

In the embodiment shown in FIGS. 5 and 6 the rigid rod 15 bears the annular weight 4, so that it may be possible to reduce the stiffness of the helical springs as 5a. Preferably, however, the same help considerably towards bearing the annular weight 4 so as to ensure that the swivel joint 17, 18 is not heavily loaded and so that friction which occurs therein during vibrations of the weight 4 is limited; in any case, such friction is limited because the contact surfaces between the pole 17 and the fixed bearing surfaces 18 are very small.

In a variant the bottom spindle extension 2c can be omitted, in which event the stationary elements of the swivel joint for receiving the bottom end of the rod 15 are secured directly to the inner wall of the hollow rotor shaft 14.

In the embodiment shown diagrammatically in FIG. 7, the rod 15, one end of which, specially the top end, is ridigly secured to the centre of the weight top member 4b, is relatively flexible whilst the other end of rod 15, specially its bottom end, has a part 28 which engages in the rotor shaft 14 substantially in the direction of the rotor axis A. The means for securing the two ends of the flexible rod 15 to the weight 4 and rotor shaft 14 can be chosen as required. In a variant, the bottom end of the flexible rod 15, instead of being engaged with the top end of the rotor shaft 14, can be engaged with a rigid member closing the bottom end of a tubular extension of the tubular spindle 2, as in the case of the extension 2c visible in FIG. 5. The advantage of these embodiments is that the flexible rod 15 so bears the annular weight 4 that its connection 28, for instance, to the top end of the rotor shaft 14, gives rise to virtually no friction when the weight 4 vibrates.

In the embodiment shown in FIG. 8, the second end, specially the bottom end, of the rigid rod 15 is coupled with the top end of the rotor shaft 14 by way of a compression spring 29 substantially coaxial of the rotor shaft axis A and is guided by at least one projection 30 on the inner wall of a tubular element 14a which extends between the top end of rotor shaft 14 and the spindle 2. The tubular element 14a can be an upwardly extending tubular extension at the top end of rotor shaft 14 or a downwardly extending tubular extension of the spindle 2; in the latter event the extension would extend into the hollow top end of the rotor shaft in the manner shown in FIG. 5. The bottom end of the rigid rod 15 can be guided either by a single annular projection concentric of the axis A or by a number of projections distributed preferably regularly around the axis A. The helical springs, as 5a and 5b, impart resilience to the weight 4 in a plane perpendicular to the rotor axis A, so that such weight can oscillate, for instance, in the direction indicated by a double arrow f1 to damp vibrations which the rotating rotor produces in the same direction, as hereinbefore described in detail, whereas the helical spring 29 coaxial of the axis A imparts vertical elasticity to the annular weight assembly so that the annular weight 4 can oscillate in the direction indicated by a double arrow f2 and can therefore damp any vertical vibration produced by the rotor as it rotates.

In the variant shown in FIG. 9, the helical spring 29 is introduced directly between the central part of the bottom surface of the weight top member 4b, the weight 4 accordingly having a dished member 30a, and the top end of the rotor shaft 14, such shaft also having a corresponding dished member 30b. The helical spring 29 also imparts a vertical resilience to the annular weight 4 so that the same can oscillate in the direction indicated by the double arrow f2 and thus damp any vertical vibrations produced by the rotor as it operates. Of course, the dished member 30b can be formed by a tubular spindle secured to the rigid part of the hub or to the end of the rotor shaft, in the manner shown in some of the drawings hereinbefore described.

We claim:

1. A resonator device for damping the vibrations of a rotary-wing aircraft rotor having a shaft presenting a top hollow part (14) and supporting a hub (1) to which at least two blades extending radially are attached, said resonator device comprising a substantially annular weight (4) disposed concentrically of the rotor axis (A) and supported substantially without bending by at least three helical springs (5a, 5b, 5c) whose axes radiate in directions distributed regularly around the rotor axis (A) and which are radially biased in said directions, said biased springs (5a, 5b, 5c), applying statically balanced centrifugal thrusts to said annular weight (4), the annular weight (4) being bell-shaped and presenting an annular skirt-like part (4a) and a flat top member (4b), said skirt-like part (4a) being concentric of a spindle (2) axially extending the rotor-shaft (14) above a rigid central part of said hub (1), and said flat top member (4b) extending transversely of said spindle (2), wherein the inner end of each said spring (5a, 5b, 5c) bears directly on said spindle (2) and the outer end of each said spring (5a, 5b, 5c) bears directly on said skirt-like part (4a), and wherein said spindle (2) is tubular and open at both its ends, a rod (15) extending through said spindle (2) and having one end rigidly secured to the central area of said flat top-member (4b) of annular weight (4), the other end of said rod (15) extending into said top hollow part (14) of said rotor shaft and being internally connected to said shaft.

2. A resonator device for damping the vibrations of a rotary-wing aircraft rotor having a shaft supporting a hub (1) to which at least two blades extending radially are attached, said resonator device comprising a substantially annular weight (4) disposed concentrically of the rotor axis (A) and supported substantially without bending by at least three helical springs (5a, 5b, 5c) whose axes radiate in directions distributed regularly around the rotor axis (A) and which are radially biased in said directions, said biased springs (5a, 5b, 5c) applying statically balanced centrifugal thrusts to said annular weight (4), said annular weight (4) being bell-shaped and presenting an annular skirt-like part (4a) and a flat top member (4b), said skirt-like part (4a) being concentric of a spindle (2) axially extending the rotor shaft above a rigid central part of the hub (1) and said flat top member (4b) extending transversely of said spindle (2).

wherein the inner end of each said springs (5a, 5b, 5c) bears directly on said spindle (2) and the outer end of each said springs (5a, 5b, 5c) bears directly on said skirt-like part (4a) and wherein said bell-shaped annular weight (4) is formed in registration with each rotor blade with an aperture (6A, 6B, 6C) extending at least in its skirt-like part (4a) and enabling said corresponding blade to make vertical flapping movements.

3. A device according to claim 2, wherein said spindle (2) is tubular and open at both its ends, a rod (15) extending through said spindle (2) and having one end rigidly secured to the central area of said flat top member (4b) of annular weight (4), the other end of said rod (15) extending into a top hollow part (14) of said rotor shaft and being internally connected to said shaft.

4. A device according to claim 1 or 3 wherein said rod (15) is rigid and said other end of said rod (15) is connected to said shaft through a swivel joint (17-18) which is secured to the inner wall of said top hollow part (14) of said shaft.

5. A device according to claim 1 or 3, wherein said rod (15) is rigid and said other end of said rod (15) is secured to an inner wall of a tubular bottom extension (2c) extending into said top hollow part (14) of said rotor shaft.

6. A device according to claim 1, wherein said bell-shaped annular weight (4) is formed in registration with each rotor blade with an aperture (6A, 6B, 6C) extending at least in its skirt-like part (4a) and enabling said blade to make vertical flapping movements.

7. A device according to claim 1 or 3, wherein said rod (15) is flexible and has its other end engaged on the rotor shaft substantially axially thereof.

8. A device according to claim 1 or 3 wherein the outer and inner ends of each helical spring are received respectively in two recessed parts disposed one opposite another, one being in the skirt-like part of said weight and the other in the outer wall of said spindle.

9. A device according to claim 8, wherein each of said recessed parts is lined with a plastic of high mechanical strength.

10. A device according to claim 8, wherein each recessed part for the outer end of one of said springs is in the form of a socket engaged in an aperture of the skirt-like part of said weight and having transverse dimensions greater than the diameter of said one helical spring, said socket being releasably secured to said skirt-like part.

11. A device according to claim 1 or 3, wherein the other end of said rod is coupled with the rotor shaft through a compression spring substantially coaxial of the rotor shaft, and is guided by projections on the inner wall of the hollow rotor shaft.

12. A device according to claim 1 or 3, wherein the other end of said rod is coupled with the rotor shaft through a compression spring substantially coaxial of the rotor shaft and is guided by projections on the inner wall of a tubular extension of said spindle, said extension extending into the hollow rotor shaft.

13. A device according to claim 2, wherein the spindle extends through a central aperture in the top part of said bell-shaped weight, and a stop element is provided on said spindle outside said bell-shaped weight for retaining said weight in the event of any of said helical springs rupturing.

14. A device according to claim 2, wherein a compression spring substantially coaxial of the rotor shaft is inserted between said spindle and the central area of the top part of said bell-shaped weight.

15. A device according to claim 2, wherein the inner end of each helical spring is engaged on a first flanged cylindrical member fitted into an aperture in the spindle wall.

16. A device according to claim 15, wherein each first flanged cylindrical member is formed with a tapped radial hole, whereby each of said cylindrical members can be coupled with the skirt-like part of the bell-shaped weight by a screwthreaded rod having its inner end screwed into said tapped hole and extending through the respective helical spring axially thereof and through an aperture in the skirt-like part of said weight in order to mount said weight with said springs on said spindle, each screwthreaded rod associated with one of said springs then being unscrewed from the tapped hole in the respective flanged cylindrical member and withdrawn through said aperture in said skirt-like part.

17. A device according to claim 16, wherein the outer end of each screwthreaded rod can be coupled with the skirt-like part of said weight by a nut screwed on the rod to engage the outer wall of said skirt-like part.

18. A device according to claim 16, wherein the outer end of each helical spring is engaged on a second flanged cylindrical member fitted into the respective aperture in the skirt-like part of said weight, said second member being formed with a bore for the respective screwthreaded rod.

19. A device according to claim 1 or 3, wherein additional weights are releasably secured to the outside wall of said bell-shaped weight.

* * * * *